Patented Aug. 17, 1954

2,686,722

UNITED STATES PATENT OFFICE 2,686,722

CANDY COLORING COMPOSITION AND PROCESS OF PREPARING SAME

Sam Goldstein, Forest Hills, N. Y., assignor to Loft Candy Corporation, Long Island City, N. Y., a corporation of New York No Drawing. Application December 12, 1950, Serial No. 200,507

3 Claims. (Cl. 99—148)

This invention relates to a food or candy coloring composition, especially for making what is called summer coatings for candy, and to the process of manufacturing the same.

Many of the desirable coloring compounds which are approved by the Food and Drug Administration as ingredients in foods are water soluble but are not fat-soluble, nor are they soluble to any great extent in grain alcohol or other non-toxic liquids. Thus it is difficult to incorporate these dyes or coloring compounds into fat containing candy ingredients in such a way as to obtain a candy or coating for candy with an even shade of the desired color that can be perfectly matched in the various batches, etc.

An object of this invention is to provide a fatty food coloring composition containing an even distribution of a relatively large amount of a fat-insoluble dye or color evenly dispersed throughout the mass thereof.

Another object of the invention is to provide a method of making a master, fatty-base food coloring, composition with coloring compounds or dyes that are fat-insoluble and are difficultly soluble in grain or ethyl alcohol and other non-toxic liquids.

Another object of the invention is to provide a master, fatty-base, food coloring composition containing a high concentration of dye or coloring matter dispersed therein which master composition is readily miscible or compatible with the more or less colorless candy compositions to impart the desired color to the candy prepared from the latter.

These and other objects ancillary thereto are obtained by separately mixing the dye with a small portion of ethyl alcohol or similar volatile non-toxic liquid, so that the alcohol dissolves as much of the dye as possible, separating the undissolved dye from the alcohol, and adding the clear solution of the dye in alcohol to a liquid fat composition under such conditions that the alcohol is evaporated off and the dye remains in the composition in a very fine state of subdivision, which approaches molecular size. Additional quantities of the alcohol solution of the dye may then be added until a relatively high concentration of the desired color is obtained in the fatty composition. This composition is then employed as the master batch to color other white or lightly colored candy or other food compositions. Virtually any shade or color can be obtained by proper blending of one or more colored master batches with the white or light colored candy coating or filling compositions.

The composition may be employed for coloring various pastry doughs, etc. but is especially useful for the preparation of the colored summer coating for candy. The composition is stable and can be stored until ready for use or it can be packaged and shipped for use at other places.

It is advantageous to pass the master batch through a colloid mill after all of the desired color has been added thereto. This produces a refined and evenly colored master composition. It might be suspected that a mixture of fat, sugar and dye could be passed through a colloid mill directly without the necessity of adding the dye in the form of an alcohol solution but candy coatings made from such compositions usually come out speckled and blotchy.

The fatty composition to which the fat insoluble dye or coloring material is added may contain other candy making ingredients such as milk, milk solids, sugars including dextrose, sucrose, levulose, maltose, etc. flavoring extracts, preservative agents, and other fat-soluble edible dyes. For example, the fatty or oleaginous material may be as much as 100% or as little as 30% of the entire mix. Sugar may be added to the extent of 0–65%, milk solids may be added to the extent of 0–35% of the mix and non-fatty milk solids may be present to the extent of around 0–10%. Compositions which contain 30–60% of sugar are very satisfactory in candy making since such compositions are very much like the final coating material which is to be made.

Examples of dyes or coloring agents which are difficult to duplicate with a fat soluble dye and which are slightly alcohol soluble are F. D. & C. Red #1 Ponceau Red, F. D. & C. Red #2 Amaranth, F. D. & C. Red #3 Erythrosine, F. D. & C. Blue #2 Indigotine and F. D. & C. Blue I Brilliant Blue. No yellow colors are mentioned because it has been found that fat-soluble, yellow colors are available on the market which are entirely satisfactory and can be dissolved directly in the fatty master mix. It is obvious of course that fat-insoluble yellow colors can be employed, if desired in a master composition.

The fatty composition into which the dye is to be incorporated is melted and held at a temperature which is above the boiling point of the alcohol or other solvent for the dye. Care must be taken to prevent the deposition of the dye on the sides of the vessel and the composition must be constantly stirred to distribute the alcohol solution throughout the composition before all of the alcohol evaporates. Examples of fatty materials which may be employed are cocoanut oil, cocoa butter, creamery butter, peanut oil, etc.

Ethyl acetate or any other solvent which is volatile below the temperature of the molten sugar composition and non-toxic in small amounts may be substituted for all or a portion of the ethyl alcohol. Since practically all of the alcohol, ethyl acetate, etc., is evaporated in the process, the fact that these materials are slightly toxic in large quantities is of minor importance.

The invention will be further understood by reference to the following examples illustrative thereof.

Example I

About 2 pounds of a fatty composition comprising about 50% of powdered sugar, 40% of cocoa butter or similar vegetable fat, 5% of milk fat and 5% of non-fatty milk solids are melted in a jacketed kettle and maintained at a temperature of 115° C. One gram of F. D. & C. Red #3 Erythrosine is dispersed in 20 ml. of alcohol and then the resultant solution is filtered. The filtrate is slowly added to the molten fatty solution with constant stirring. After all the alcohol is evaporated, a second filtered solution of the dye in alcohol is added and the process repeated until the desired color is obtained. After about 100 ml. of the alcohol solution has been added a red master mix is obtained which is sufficient to color 100–150 pounds of summer coating depending upon the shade desired in the coating.

Example II

Two pounds of a fatty composition containing 30% of powdered sugar (made up of dextrose and sucrose) 60% of a mixture of cocoanut oil and cocoa butter and 10% of milk to which about 0.5 g. of fat soluble yellow coloring has been added, is melted and maintained at a temperature of about 120° in a jacketed kettle.

An alcohol solution of F. D. & C. #1 Brilliant Blue is prepared by shaking an excess of the dye in 100 ml. of alcohol and filtering the resultant solution. This solution is added in small amounts to the molten fatty composition while rapidly stirring the composition. A green colored fatty composition having the dye uniformly dispersed therein is obtained which is sufficient to color 100–150 pounds of coating.

I claim:

1. The process of making an even, substantially molecular dispersion of an edible, fat-insoluble, partially alcohol-soluble, dye in a fatty-base, master dye mix for dyeing fatty food compositions comprising the steps of providing a fatty base composition containing 30–100% of an oleaginous food material, 0–65% of a sugar and 0–35% of milk fat and non-fatty dried milk products, melting the fatty composition, separately mixing an excess of the fat-insoluble dye with a volatile, organic non-toxic liquid in which the dye is partially soluble, separating the undissolved dye from the organic liquid, adding the liquid containing the dissolved dye to the melted composition while constantly stirring the latter, maintaining the temperature of the fatty composition above the boiling point of the volatile organic liquid thereby evaporating the said liquid and depositing the dye in the fatty composition in substantially the same degree of subdivision as in said volatile liquid solution, continuing the addition of the dye solution containing the dissolved dye until a highly colored master dye composition capable of dyeing large batches of similar fatty compositions is obtained.

2. The process of making an even, substantially molecular dispersion of an edible, fat-insoluble, partially alcohol-soluble, dye in a fatty base master dye mix for dyeing fatty food compositions comprising the steps of providing a fatty base composition containing 30–100% of an oleaginous food material, 0–65% of a sugar and 0–35% of milk fat and non-fatty dried milk products, melting the fatty compositions, separately mixing an excess of the fat-insoluble dye with an excess of ethyl alcohol, separating the undissolved dye from the ethyl alcohol solution, adding the ethyl alcohol solution of the dye to the melted composition while constantly stirring the latter, maintaining the temperature of the melted composition above the boiling point of the alcohol thereby evaporating the alcohol and depositing the dye in the fatty composition in substantially the same state of subdivision as in the said alcohol solution, continuing the addition of the dye solution containing the dissolved dye until a highly colored master dye composition capable of dyeing large batches of similar fatty compositions is obtained.

3. A fatty composition for the coloring of summer coatings for candy consisting essentially of the following ingredients, 30–100% of an edible oleaginous food component, 0–65% of a sugar and 0–35% of milk fat and non fatty dried milk products having in addition a fat-insoluble dye uniformly dispersed throughout the mass thereof, said dye being in substantially a molecular state of subdivision, substantially 100% of said composition consisting of the said ingredients, said composition being made by the process of claim 1.

References Cited in the file of this patent

UNITED STATES PATENTS

| Number | Name | Date |
|---|---|---|
| 1,678,648 | Replogle | July 31, 1928 |
| 1,919,025 | Jones et al. | July 18, 1933 |
| 2,007,727 | Putt | July 9, 1935 |